Patented Oct. 21, 1930

1,779,299

UNITED STATES PATENT OFFICE

HARBEN JAMES VALENTINE, OF DUNDEE, SCOTLAND

PROCESS FOR PRESERVING FLOWERS, FOLIAGE, AND THE LIKE

No Drawing. Application filed December 23, 1929, Serial No. 416,207, and in Great Britain September 12, 1928.

This invention relates to the preservation of flowers and foliage.

The object of the invention is to provide a process for this purpose whereby the flowers may be preserved from decay, and the natural colours obscured, supplemented, or retained, and also wherein the flowers and foliage are caused to retain their natural form and arrangement.

The invention consists in a process for preserving flowers, foliage, or the like, by giving the materials a coating of waxy material having a suitable melting point, and also a coating with a suitable colloid, with a further binding coating interposed between the waxy coating and the colloidal coating.

The invention further consists in a process for preserving flowers, foliage, or the like, according to the preceding paragraph, wherein a preservative, for example, camphor, boric acid, salicylic acid or the like, is incorporated in one or both of the waxy and colloidal coatings.

The invention still further consists in a process for preserving flowers, foliage, or the like, according to the preceding paragraphs, having loading materials; for example, zinc oxide and/or colouring materials added, or applied, to the coatings.

Further features of the invention will be apparent from the following description:—

According to my invention, I may, where necessary, give the flowers, foliage, or the like, which may be either dried or in their natural state, preliminary treatment with alcohol which may contain a preservative medium with an acid reaction when applied to flowers whose colours range from red to pink, and an alkaline reaction when used for flowers whose colours range from blue to white.

To stiffen the natural tissues, the flowers or foliage are coated with a waxy material by dipping or otherwise; paraffin wax having a melting point of 45° to 50° centigrade having been found suitable for the purpose, a wax having a higher melting point temperature being liable to injure the tissues.

This wax treatment has been found effective in retaining the flowers or the like in their original or natural shape.

The waxy material may be paraffin wax, or beeswax, or a mixture of paraffin wax and beeswax.

The flowers or foliage are then coated with a varnish or emulsion to act as a binding coating to assist or ensure the adhesion of a final coating of gelatine, albumen, or the like, with or without the addition of a suitable dye, which final coating may be subsequently hardened by the action of formaldehyde or other hardening agent.

By means of this final treatment of gelatine, albumen, or the like, it is possible to employ a waxy material of low melting point, as this gelatinous or other final coating functions to supplement the stiffening effect of the wax while acting as protective coating against fracture.

Loading material such as zinc oxide, barytes, or the like, may be added to the coatings, for the purpose of obscuring or modifying the natural colour.

The following is an example of one way of carrying my invention into practice, as applied to the preservation of a daffodil flower.

In the first stage of the treatment a coating of the following solution is applied to the surface:—

Methylated spirit _____ 80 parts
Boric acid _____ 10 parts
Rosin _____ 10 parts

The superfluous solution is then whirled off, and after the coating has dried, the further coating is then applied comprising the following:—

Paraffin wax _____ 8 parts
Bees wax _____ 2 parts

The melting point of the wax is not to exceed 50° centigrade.

After the wax coating has solidified the following solution is applied:—

Methylated spirit _____ 20 parts
Ether _____ 20 parts
Rosin _____ 1 part

This coating acts as an adhesive or binder between the wax coating and the colloidal coating following, which consists of:—

| | |
|---|---|
| Gelatine | 1 part |
| Water | 3 parts |

The flower is dipped in the gelatinous solution and the superfluous solution whirled off, after which I may add a final waterproofing coating such as a solution of celluloid or rubber.

All the ingredients above referred to are measured by weight.

Any or all of the above coatings may be applied with a brush or by spraying, dipping, or otherwise.

Dyeing matter or pigment may be added to either or all of the coatings; and the gelatinous or other coating may be built up by the application of several thin coats.

Colouring or loading matter may be added to any one or all of the applications and in any suitable form, and where necessary or desirable the general colouring or dyeing may be supplemented by the local application of colour by hand.

What I claim and desire to secure by Letters Patent is:—

1. A process of preserving flowers, foliage, or the like, which comprises coating the materials with a waxy material having a suitable melting point, then coating the materials with a suitable binding, and thereafter applying a colloid coating to said materials.

2. In a process of preserving flowers, foliage, or the like, coating the materials with paraffin wax having a melting point not higher than 50° centigrade, then applying a coating of varnish to act as a binder, and thereafter applying a coating of a suitable colloid.

3. In a process of preserving flowers, foliage or the like, coating the materials with a waxy material having a suitable melting point, applying a binding coating, adding a coating of a suitable colloid, and applying a hardening agent thereto.

In testimony whereof, I affix my signature.

HARBEN JAMES VALENTINE.